April 30, 1940.　　　　V. E. BONNEFOY　　　　2,199,301
WATER DISPENSER
Filed June 6, 1939
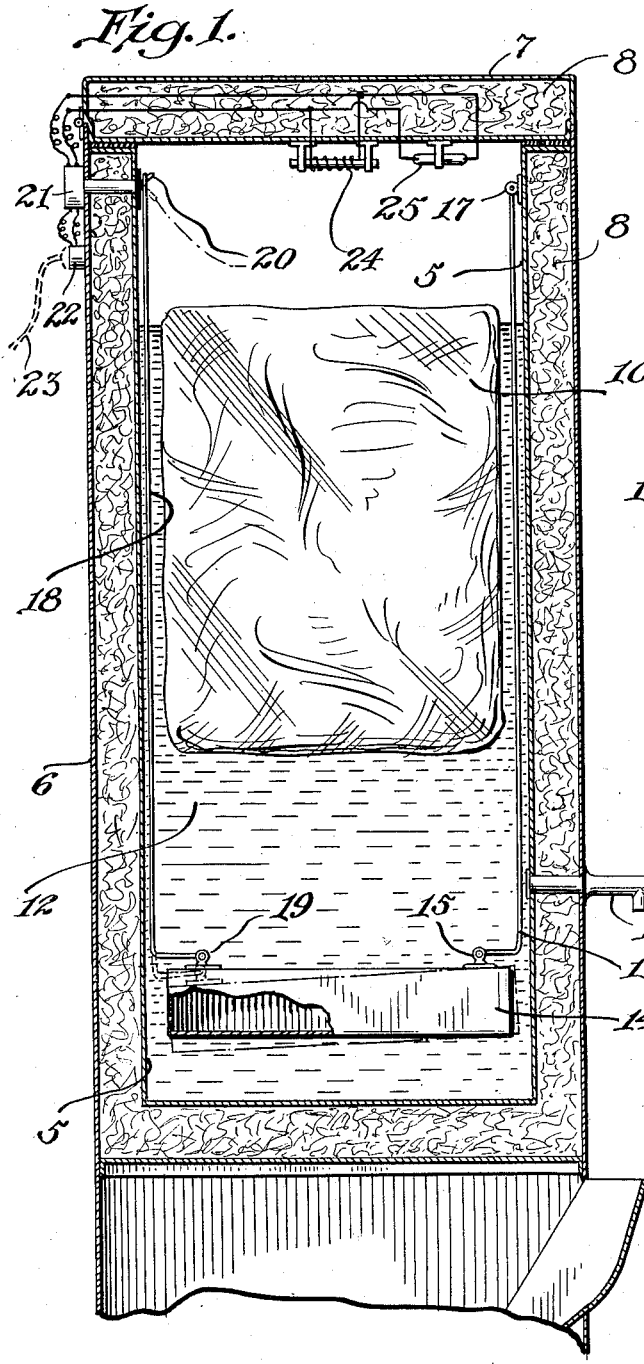
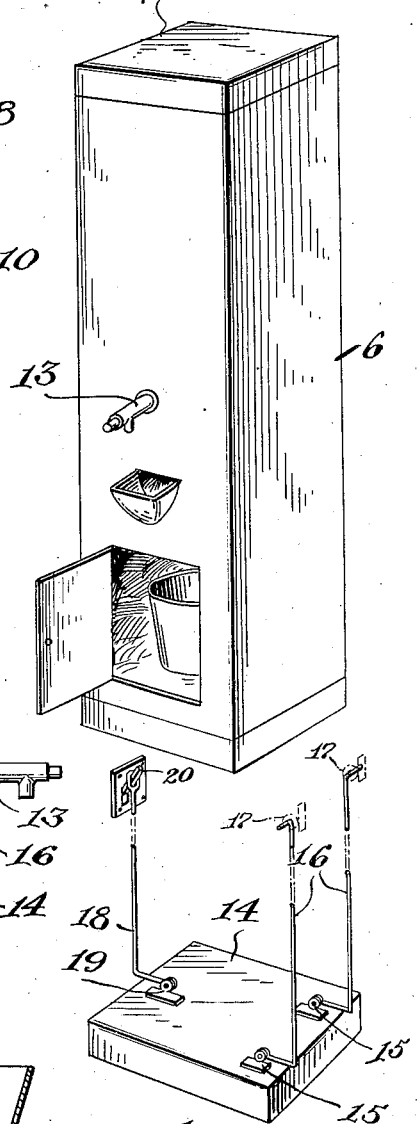
Inventor
Victor E. Bonnefoy
Eugene C. Brown
Attorney Patented Apr. 30, 1940

2,199,301

UNITED STATES PATENT OFFICE 2,199,301

WATER DISPENSER

Victor E. Bonnefoy, Albuquerque, N. Mex.

Application June 6, 1939, Serial No. 277,685

7 Claims. (Cl. 62—142)

This invention relates to water dispensers which are mainly intended for use in business places and homes to supply cool water for drinking purposes.

The object of the invention is to provide an apparatus which will maintain a supply of water at the desired temperature and particularly to automatically control the quantity of water available in accordance with the demand. A further object is to provide means for maintaining the purity of the water.

In carrying out the purposes of my invention, the container or reservoir is supplied from time to time with a block of ice frozen from pure water which has been processed so as to be most desirable for drinking purposes. The melting of the ice supplies the water for drinking purposes and the melted water maintains the desired temperature. In order to control the required supply of water in the container, I provide automatic means for causing the ice to melt in accordance with the demand.

My invention will be more readily understood from the following description of the construction and operation of the apparatus illustrated in the accompanying drawing in which—

Figure 1 is a vertical sectional view of an apparatus embodying the invention;

Figure 2 is a perspective view of the same;

Figure 3 is a perspective view of a float member which serves to control the automatic operation of the ice-melting medium.

The container or reservoir 5 is constructed of suitable rustless material, such as stainless steel and is enclosed in an outer casing 6, having a hinged lid 7, and is thoroughly insulated with mineral wool 8 or other heating-insulating material.

The block of ice 10 normally floats in the water 12 at some distance above the inner end of faucet 13. In case the water is withdrawn faster than it is replenished by the melting ice, the latter will descend until it finally rests upon the hollow metal float 14, which is hinged at 15 to rods 16, which extend upwardly and are fastened to the wall of the container adjacent the top by pin joints 17, so that they may be readily disconnected when it is desired to remove the float for the purpose of cleaning or inspecting the parts of the container.

A rod 18 fastened at 19 to the float at the side opposite the hinges 15, is connected at its upper end to the operating arm 20 of an electric switch 21, which is connected by the plug connector 22 and cable 23 to a source of electric power. A heater 24 and an ultra-violet lamp 25 are connected to the switch 21.

The normal melting of the block of ice in the container is ordinarily sufficient to furnish an adequate supply of water for drinking purposes. However if the supply is lowered until the water is nearly at the level of the faucet, the ice remaining in the container will then come in contact with the float 14 and will cause it to tilt downwardly on the hinges 15, thereby moving the switch-arm 20 into closed position, thus connecting the heater 24 and lamp 25 with the electric source. The heater will immediately cause the ice to melt and the ultra-violet rays from the lamp 25 will exert a purifying action. When water has accumulated sufficiently to float the ice, or in case it is completely melted, the float will resume its normal position, rod 18 and switch 21 being returned to normal open switch position by a light spring not shown, thereby moving the switch-arm 20 to its off position, and disconnecting the heater and lamp.

I have described the preferred construction of my automatically controlled cool water dispenser but it will be evident to engineers that other arrangements and modifications may be made within the purview of my invention and scope of the appended claims.

I claim:

1. In a water dispenser in which the water in a reservoir or container is cooled by a block of ice inserted in the container, the method of augmenting the water supply in accordance with the demand which consists in intermittently subjecting the ice to the action of a heating medium, said heating action being controlled by the position of said block of ice.

2. In a water dispenser in which the water in a reservoir or container is cooled by a block of ice inserted in the container, the method of regulating the water supply in accordance with the demand which consists in augmenting the supply of water in the container at intervals, by applying a heating medium to melt a portion of the ice, and controlling the melting period by the position of the ice block in the container.

3. A water dispenser comprising a water container provided with heat insulated walls and a removable top closure, and having an interior space of substantially uniform diameter to permit the vertical movement of a block of ice, means for producing a heated area in the upper portion of said space to thereby melt a portion of the ice, and means determined by the position of a block of ice in said space for controlling the production and duration of said heat.

4. A water dispenser comprising a water container provided with heat insulated walls and a removable top closure, and having an interior space of substantially uniform diameter to permit the vertical movement of a block of ice, heating means in the upper portion of said container, a device controlling the operation of said heating means, a member secured in the lower portion of said container in a manner to permit of a limited movement thereof, and means connecting said member and said controlling device, whereby the operation of said device is effected by the engagement and disengagement of the block of ice with said movable member.

5. A water dispenser comprising a water container provided with heat insulated walls and a removable top closure, and having an interior space of substantially uniform diameter to permit the vertical movement of a block if ice, heating means in the upper portion of said container, a device controlling the operation of said heating means, a float positioned in the lower part of said container and pivotally secured at one side thereof and operatively connected at the opposite side to said controlling device, whereby the downward tilting of the float when engaged by the block of ice causes said controlling device to operate said heating means.

6. A water dispenser comprising a water container or reservoir provided with heat insulated walls and top closure, said container having an interior space of substantially uniform cross-sectional area to permit the free vertical movement of a block of ice, an electric heating unit positioned in the upper portion of the container, a switch operatively arranged to connect and disconnect said heater to a source of electric power, a tiltable member pivotally secured at one side in the lower part of the container and operatively connected to the control member of said switch, whereby the switch is operated to energize said heating unit by the engagement of the ice with said tilting member and is actuated to disconnect the heating unit when the ice is withdrawn from engagement with said tilting member.

7. A water dispenser as set forth in claim 6 and an ultra-violet lamp connected in circuit with said heating unit.

VICTOR E. BONNEFOY.